O. E. OLESBERG.
BRUSH AND CHOPPING AX.
APPLICATION FILED JAN. 29, 1920.
1,423,140.
Patented July 18, 1922.
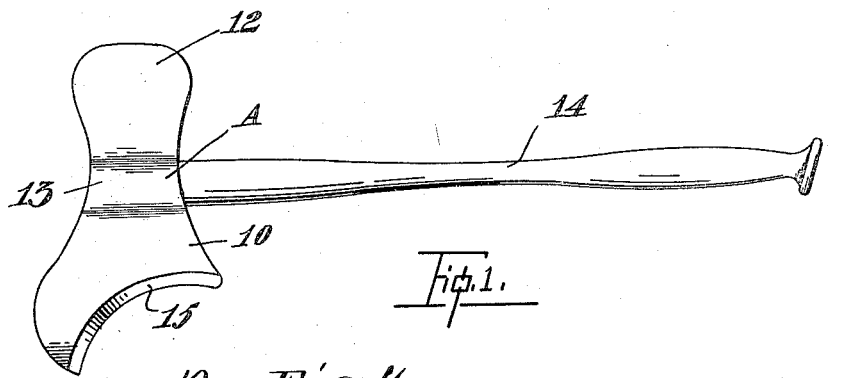
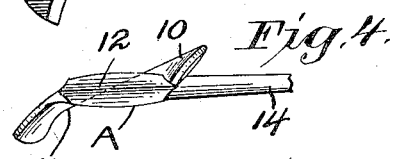
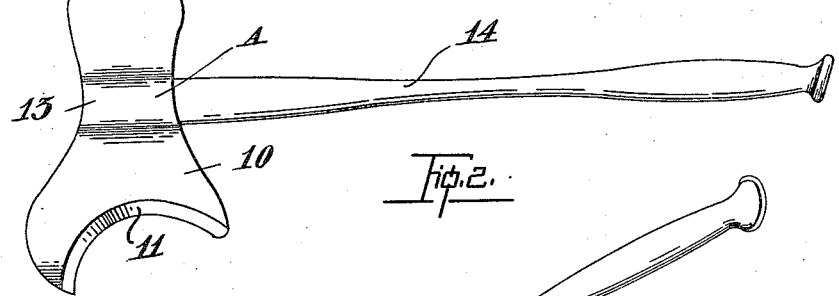
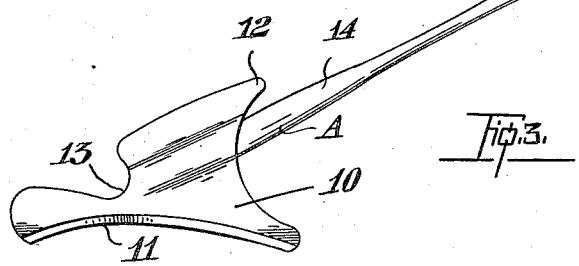
INVENTOR
OLUF. E. OLESBERG
BY
ATTY'S

UNITED STATES PATENT OFFICE.

OLUF ESACK OLESBERG, OF BAWLF, ALBERTA, CANADA.

BRUSH AND CHOPPING AX.

1,423,140.

Specification of Letters Patent. Patented July 18, 1922.

Application filed January 29, 1920. Serial No. 354,768.

*To all whom it may concern:*

Be it known that I, OLUF ESACK OLESBERG, a subject of the King of Great Britain, a resident of the town of Bawlf, Province of Alberta, Dominion of Canada, have invented certain new and useful Improvements in Brush and Chopping Axes, of which the following is a specification.

This invention relates to improvements in brush and chopping axes, and the objects of the invention are to so construct the ax than when clearing brush, a scythe-like cut may be used whereby the brush will be cut close to the root without the disadvantage of the user requiring to bend during the process, to permit of the ax being used for chopping purposes, and generally to adapt the ax to better perform the functions required of it.

With the above and other objects in view, the invention consists essentially of the improved construction particularly described and set forth in the following specification and accompanying drawings forming part of the same.

In the drawings:

Figure 1 is a side elevation of an ax constructed in accordance with my invention.

Fig. 2 is a side elevation of another form of my invention, the brush ax being constructed with a different cutting edge to that shown in Fig. 1.

Fig. 3 is a perspective view of the ax shown in Fig. 1.

Fig. 4 is a plan view of the same.

Fig. 5 is an enlarged plan view of the ax shown in Fig. 2.

Like characters of reference refer to like parts in the several figures.

Referring to the drawings; A represents the improved brush and chopping ax, comprising a brush blade 10 having a curvilinear cutting edge 11, and formed integral with the brush blade 10 is a chopping blade 12. An eye 13 is provided between the brush and the chopping blades 10 and 12, and a handle 14 engages with this eye, and the longitudinal axis of the handle is angularly disposed to the plane of the brush blade 10, while it is in alinement with the plane of the chopping blade 12.

I have found that an inclination between 15 and 60 degrees give good results in practice. As shown in Fig. 4 the inclination is about 30 degrees.

In this way it will be seen that the cutting edge 11 of the brush ax 10 can be directed to a point adjacent to the root of any brush being cut, and when delivering a blow, the user does not require to stoop or bend unduly.

The handle 14 is arranged angularly to permit of the user standing upright and in a position best calculated to give an effective blow and so that work may be continued without tiring the user excessively.

The only difference that exists between Fig. 3 and the device illustrated in Figs. 1 and 2 is the formation of the cutting edge 15 of the brush ax 10.

This cutting edge 15 is curvilinear for the major part of its length and then curved less abruptly, and is effective for some kinds of work but it cannot be used so effectively to make slanting cuts as the ax illustrated in Figs. 1 and 2. In using this type of ax it will be evident that since the handle is angularly disposed to the plane of the brush ax, then the user can stand in an easy position without undue bending and use the brush ax with freedom. A better blow is obtained and closer cutting to the root of the brush than with ordinary brush axes, so that an effective clearance of the brush results.

As many changes could be made in the above construction, and many apparently widely different embodiments of my invention, within the scope of the claim, could be constructed without departing from the spirit or scope thereof, it is intended that all matter contained in the accompanying specification and drawings shall be interpreted as illustrative and not in a limiting sense.

What I claim as my invention is:

A brush ax comprising a brush bit having a curved cutting edge and an eye through the top of the bit in a plane angularly disposed to the plane of the cutting edge, and a curvature in said bit from the eye towards the cutting edge whereby direct contact with the ground by said cutting edge is avoided.

In witness whereof I have hereunto set my hand in the presence of two witnesses.

OLUF ESACK OLESBERG.

Witnesses:
NILS KOITTUN,
ALBERT ZEMLICKA.